April 20, 1926.

E. T. LARKIN

PISTON

Filed July 12, 1924

1,581,964

Inventor
Elwood T. Larkin
by Poffe & Powers
Attys.

Patented Apr. 20, 1926.

1,581,964

UNITED STATES PATENT OFFICE.

ELWOOD T. LARKIN, OF BUFFALO, NEW YORK, ASSIGNOR TO CHARLES A. CRIQUI, OF BUFFALO, NEW YORK.

PISTON.

Application filed July 12, 1924. Serial No. 725,718.

*To all whom it may concern:*

Be it known that I, ELWOOD T. LARKIN, a citizen of the United States, residing at Buffalo, in the county of Erie and State of New York, have invented a new and useful Improvement in Pistons, of which the following is a specification.

This invention relates to a piston which is more particularly designed for use in explosion engines.

As is well known the heat absorbed by the head of a piston is dissipated mainly through the rim of the body which connects with the edge of the head and contains the packing rings and the skirt of the body which connects with the rim.

Heretofore the body of the piston has usually been provided with longitudinal ribs to aid in dissipating the heat and avoid undue heating of the wrist pin bearings mounted on the body but this has been found objectionable because the heat by this means is not dissipated uniformly and also because such variation or irregularity in the shape of the body produced a distortion in the skirt of the same which caused uneven contact of the piston with the cylinder and resulted in uneven and destructive localized wear thereon during temperature changes.

It is the object of this invention to provide a piston in which the use of longitudinal ribs in the body is eliminated and the piston is so organized that the sectional form of the same is substantially uniform and the wrist pin bearings so arranged that a practically uniform expansion and contraction of the piston takes place during temperature changes so that distortion and uneven wear are avoided and heating the wrist pin bearings is reduced to a minimum.

In the accompanying drawings.

Similar characters of reference indicate like parts throughout the several views.

Figure 1:
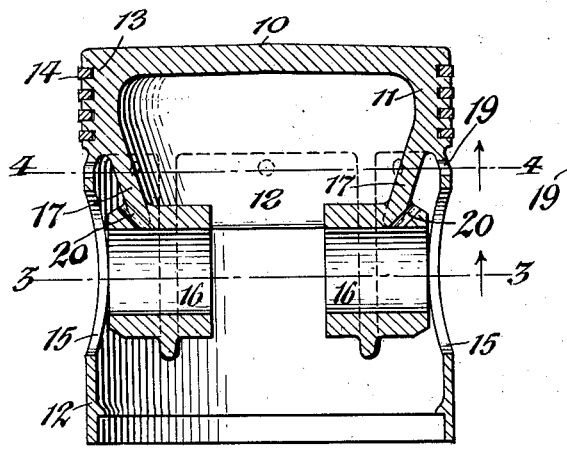
Figure 1 is a longitudinal section of a piston embodying my invention, the section being taken lengthwise through the wrist pin bearings.

The numeral 10 represents the disk shaped head of the piston which is exposed on its upper side direct to the heat of the exploding mixture in the engine cylinder and absorbs the same. The cylindrical body of the piston which is arranged below the piston and engages its periphery with the bore of the cylinder comprises an upper comparatively thick annular rim 11 which is connected at its upper edge with the edge or margin of the head and a lower comparatively thin skirt 12 which is connected at its upper edge with the lower edge of the rim. The rim of the body forms the ring zone of the same and is provided on its periphery with a plurality of annular grooves 13 each of which contains a packing ring 14 of any suitable construction adapted to engage with the bore of the engine cylinder and form a tight joint therewith. On diametrically opposite sides of the skirt the same is provided with wrist pin openings 15 through which the wrist pin is inserted and removed whereby the piston is connected with the connecting rod. Within the skirt of the body are arranged two wrist pin bearings 16 which are in line with said wrist pin openings and separated from the bore of said skirt by intervening spaces. These wrist pin bearings are mounted on the lower ends of downwardly converging supporting arms 17 arranged lengthwise within the body on diametrically opposite sides of the skirt and spaced therefrom and each of these arms being connected at its upper end with the adjacent part of the lower end of the rim which carries the ring zone.

Figure 2:
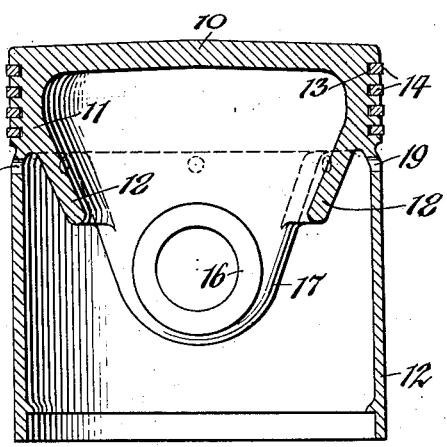
Figure 2 is a similar view taken at right angles to Figure 1.
Figure 3:
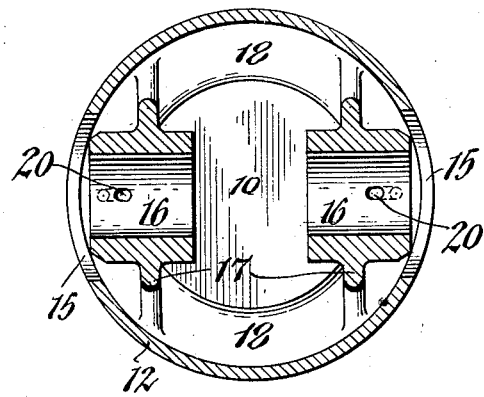
Figures 3 and 4 are cross sections taken on the correspondingly numbered lines in Figure 1.
Figure 4:
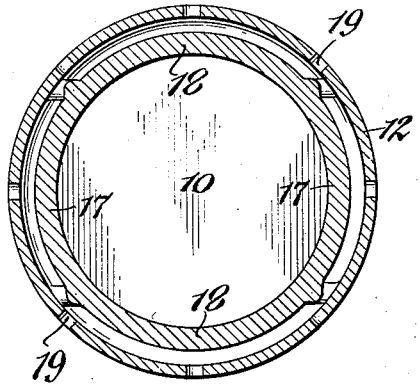

Projecting downwardly from the lower edge of the rim within the body and connecting opposite sides of the two supporting arms are two reinforcing flanges 18 which converge downwardly and which together with the arms form substantially a truncated hollow downwardly tapering cone, as shown in Figures 1 and 2.

At the upper end of the skirt the same is provided with a plurality of holes 19 through which oil removed from the cylinder wall by the packing rings is conducted to ducts 20 in the outer ends of the wrist pin bearings for lubricating the same.

In this piston the sections of the various parts are substantially uniform so that no distortion of the same will occur when subjected to changes in temperature, thereby avoiding uneven contact between the piston and the cylinder and preventing destructive localized wear. Furthermore the heat absorbed by the head is dissipated initially by the ring zone of the rim and finally by the skirt of the body and as the wrist pin bearings are connected with the body at the lower end of the ring zone rim no appreciable amount of heat therefore reaches the wrist pin bearings inasmuch as it is diverted from the same by the ring zone and skirt, thereby avoiding undue heating and wearing of these bearings and improving the lubrication of the wrist pin accordingly.

Moreover the construction of the piston as a whole is strengthened without the use of internal longitudinal ribs whereby the objectionable results due to the use of such ribs are avoided.

I claim as my invention:—

A piston comprising a head, a cylindrical body having a comparatively thick upper rim which is connected at its upper end with the edge of the head and provided on its periphery with a ring zone and a comparatively thin lower skirt connected at its upper end with the lower end of said rim, supporting arms arranged within the body and connected at their upper ends with the lower end of said ring zone rim, wrist pin bearings arranged at the lower ends of said arms, and downwardly converging flanges connecting the lower end of said rim with said arms.

In testimony whereof I affix my signature.

ELWOOD T. LARKIN.